United States Patent [19]
Bäbler

[11] Patent Number: 4,783,540
[45] Date of Patent: Nov. 8, 1988

[54] SOLID SOLUTIONS OF PYRROLO-(3,4-C)-PYRROLS

[75] Inventor: Fridolin Bäbler, Marly, Switzerland

[73] Assignee: Ciba-Geigy Corporation, Ardsley, N.Y.

[21] Appl. No.: 79,057

[22] Filed: Jul. 29, 1987

[30] Foreign Application Priority Data

Aug. 7, 1986 [CH] Switzerland .......................... 3171/86

[51] Int. Cl.$^4$ ........................................... C07D 487/04
[52] U.S. Cl. .................................... 548/453; 546/271; 544/333; 106/288 Q; 106/498
[58] Field of Search ......................... 548/453; 546/271; 544/333

[56] References Cited

U.S. PATENT DOCUMENTS 4,415,685 11/1983 Iqbal et al. ............................ 548/543
4,579,949 1/1986 Rochat et al. ......................... 548/543
4,659,775 4/1987 Pfenninger et al. ................... 548/453
4,720,305 11/1987 Iqbal et al. ............................ 548/453

OTHER PUBLICATIONS

C. A., 105, 210422b (1986).

Primary Examiner—Richard L. Raymond
Assistant Examiner—D. B. Springer
Attorney, Agent, or Firm—Luther A. R. Hall

[57] ABSTRACT

A solid solution of 1,4-diketopyrrolo-[3,4-c]-pyrrols consisting of two different compounds of the formulae

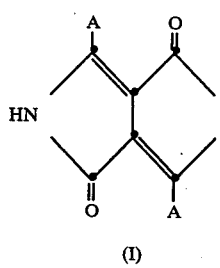 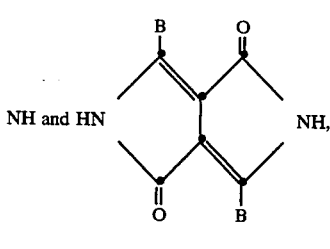
(I)            (II)

the formulae

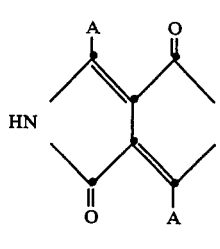 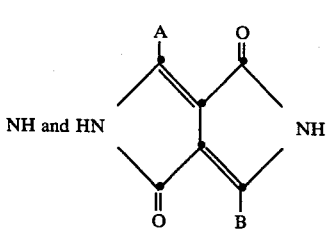
(I)            (III)

or the formulae

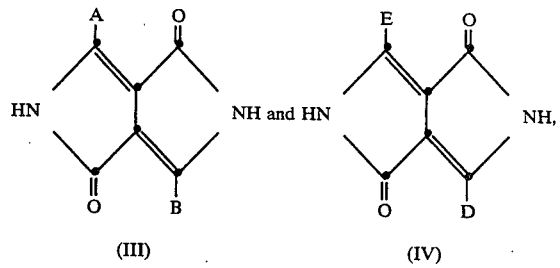
(III)            (IV)

wherein A is one of the groups

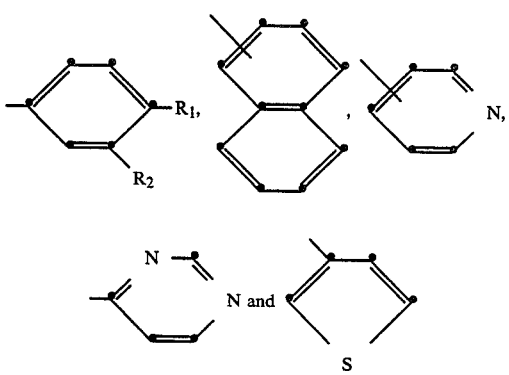

and B, E and D are each independently a group

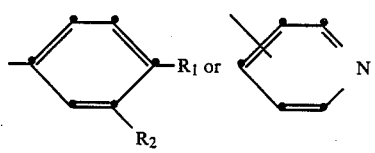

where $R_1$ and $R_2$ are each independently hydrogen, halogen, $C_1$-$C_5$-alkyl, $C_1$-$C_5$-alkoxy, —$SR_3$, —$N(R_3)_2$, —$CF_3$, —CN, a group

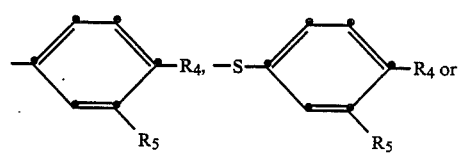

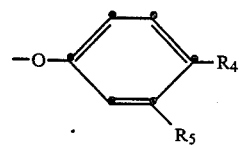

$R_3$ is $C_1$-$C_5$-alkyl and $R_4$ and $R_5$ are each independently hydrogen, halogen, $C_1$-$C_5$-alkyl, $C_1$-$C_5$-alkoxy,—$SR_3$ or—CN having X-ray diffraction patterns which differ from the sum of the X-ray diffraction patterns of the individual components.

Such solid solution are excellently suited as pigments for the coloration of high molecular organic material.

6 Claims, No Drawings

SOLID SOLUTIONS OF PYRROLO-(3,4-C)-PYRROLS

The present invention relates to solid solutions of 1,4-diketo-pyrrolo-[3,4-c]-pyrrols and their use in the colouration of high molecular organic material.

European patent application No. 94 911 and European patent application 181 290 disclose diketopyrrolopyrrol pigment mixtures which are obtained by co-synthesis. These must of necessity always be mixtures of at least three diketopyrrolopyrrol pigments of the following three types

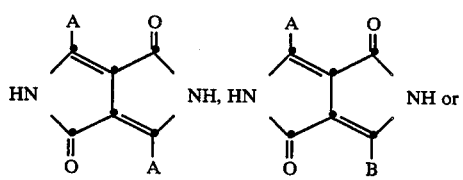

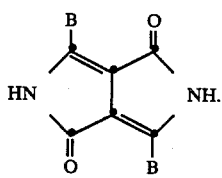

It has now been found that it is possible to obtain solid solutions of two different diketopyrrolopyrrol pigments which are distinguished by excellent pigment properties.

The present invention accordingly relates to solid solutions of 1,4-diketo-pyrrolo-[3,4-c]-pyrrols consisting of two different compounds of the formulae

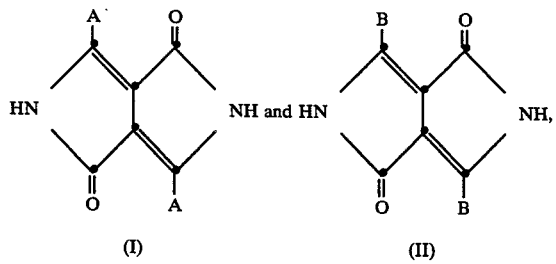

the formulae

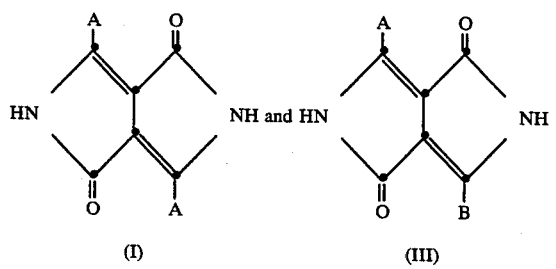

or the formulae

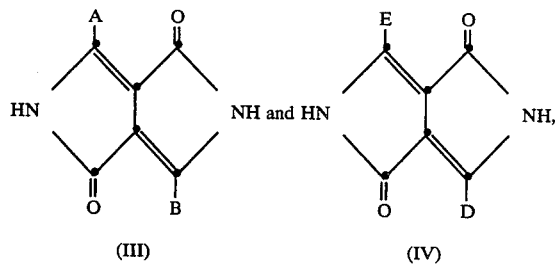

where A is a group selected from

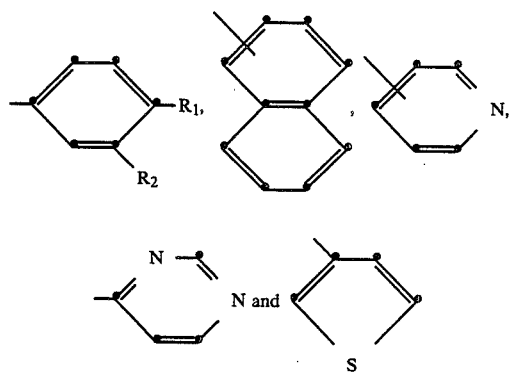

and B, E and D are each independently a group

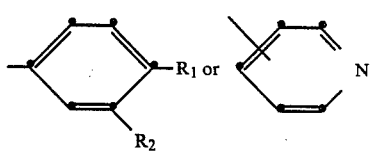

where $R_1$ and $R_2$ are each independently hydrogen, halogen, $C_1$–$C_5$-alkyl, $C_1$–$C_5$-alkoxy, $-SR_3$, $-N(R_3)_2$, $-CF_3$, $-CN$ or a group of the formulae

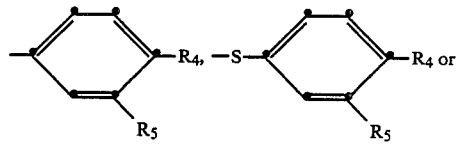

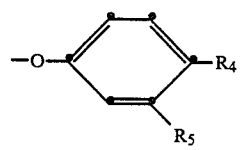

where $R_3$ is $C_1$–$C_5$-alkyl and $R_4$ and $R_5$ are each independently hydrogen, halogen, $C_1$–$C_5$-alkyl, $C_1$–$C_5$-alkoxy, $-SR_3$ or $-CN$, the X-ray diffraction patterns of which solid solutions differ from the sum of the X-ray diffraction patterns of the individual components.

Substituents defined as halogen may be for example fluorine, preferably bromine and in particular chlorine.

Substituents defined as $C_1$–$C_5$-alkyl may be for example methyl, ethyl, n-propyl, isopropyl, n-butyl, sec.-butyl, tert.-butyl, n-pentyl, isopentyl, neopentyl or tert.-pentyl.

Substituents defined as $C_1$–$C_5$-alkoxy may be for example methoxy, ethoxy, n-propoxy, n-butoxy, sec.-butoxy, n-pentyloxy, isopentyloxy or neopentyloxy.

Of particular interest are solid solutions of two different compounds of the formulae I and II where A and B have the meaning set out above.

Of quite particular interest are solid solutions of two different compounds of the formulae I and II where A and B are each independently a group o the formulae

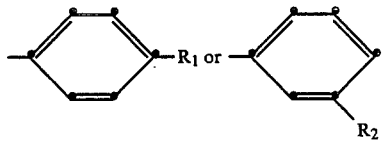

where $R_1$ is hydrogen, chlorine, bromine, cyano, methyl, ethyl, tert.-butyl or phenyl and $R_2$ is hydrogen, chlorine, methyl or cyano.

Preferred solid solutions are those of the compound of formula

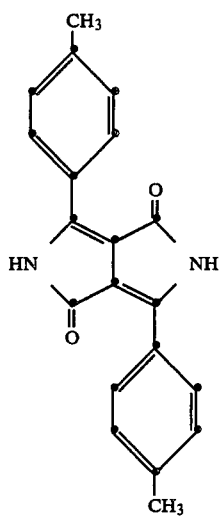

(a)

and the compound of formula

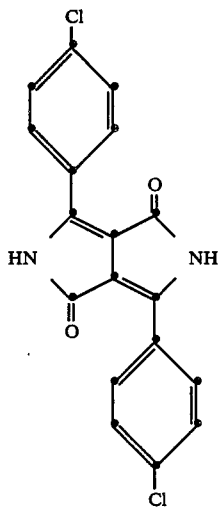

(b)

or the compound of formula

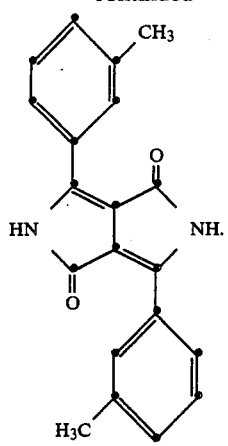

(c)

In the solid solutions of the invention the ratio between the two compounds of the formulae I:II, I:III or III:IV is suitably 50–95:5–50, preferably 65–90:10–35% by weight.

The solid solutions of the invention may be produced starting from physical mixtures of the above defined components of the formulae I and II, I and III or III and IV using the following per se known processes:
through contacting in polar organic solvents, preferably by stirring of the mixture of components under reflux,
through alkaline precipitation of the mixture of components in polar organic solvents or by stirring of the mixture of components in polar organic solvents in the presence of alkali metal alcoholates, alkali metal hydroxides or quaternary ammonium compounds,
through acid precipitation, i.e. dissolution of the mixture of components in acid and precipitation of the solid solution by dilution with water, or
through intensive grinding or kneading of the mixture of components if necessary with subsequent recrystallization from water and/or organic solvents.

Polar organic solvents in the presence of which the individual components may be contacted to form the solid solutions of the invention may, for example, be dimethylformamide, N-methylformamide, tetramethyl urea, dimethylacetamide, N-methylpyrrolidone, dimethyl sulfoxide, tetramethyl sulfone, glacial acetic acid, ketones such as cyclohexanone, alcohols such as n-butanol, cyclohexanol or benzyl alcohol, furthermore ethylene glycol, propylene glycol, ethers such as ethylene glycoldimethyl ether, diphenyl ether, anisole as well as aromatic hydrocarbons such as nitrobenzene, chlorobenzene, dichloro and trichlorobenzenes, toluene and xylenes or esters such as ethyl acetate or butyl acetate.

In the case of alkaline precipitation, the physical mixture of the individual components is dissolved in a polar organic solvent, preferably an alcohol of the formula $C_nH_{2n+1}$—OH, where n is a whole number from 1 to 5, by the addition of an at least equivalent amount of a base, such as for example Na-alcoholate, sodium hydroxide solution, potassium hydroxide solution or ammonia, whereupon the solid solution is precipitated by dilution with water or by addition of a mineral or organic acid such as hydrochloric acid, sulfuric acid or acetic acid.

In certain cases it is possible to prepare the solutions of the invention from separately prepared diketopyrrolopyrrol pigments directly by mixture of the corresponding alcoholic pigment salt synthesis suspensions, subsequent precipitation with water or acid and optionally subsequent recrystallization.

Sulfuric acid and phosphoric acid are particularly suitable for acid precipitation. The pigment obtained in this manner is very finely crystalline and is therefore preferably recrystallized by heating the acidic aqueous pigment suspension with or without organic solvent.

The solid solutions of the invention are preferably those obtained from the physical mixtures of components produced by means of grinding or kneading, for example kneading in the presence of salts in the presence of an organic solvent such as diacetone alcohol.

Particularly preferred processes are dry grinding, dry grinding in the presence of salt, grinding in an organic solvent and/or water. Grinding bodies which may be used include metal, glass or ceramic beads, plastic granules or sand, such as customarily used for pigments.

The grinding and kneading is suitably conducted at temperatures between from 5° to 90° C., preferably between from 15° to 60° C.

Dry salt grinding preferably uses sodium chloride, $CaCl_2$, $Na_2SO_4$ or $Al_2(SO_4)_3$ with or without water of crystallization. To 100 to 150 parts by weight of salt there are for example used 10 to 50 parts by weight of pigment. It may be of advantage here to add to the grinding medium small amounts of solvents such as xylene or tetrachloroethylene and/or surfactants such as sodium dodecylbenzene sulfonate. Working up is conducted according to a per se known method by separating the pigment/salt mixture from the grinding bodies and then adding it to water and subsequently filtering off the so-obtained pigment suspension.

Aqueous grinding of the physical mixture of pigments may be carried out with or without grinding aids such as for example described in European patent application No. 101666. It may be of advantage here to shift the pH from the neutral into the acid or alkaline range.

Although the solid solutions of the invention have excellent applicatory properties, it may be advantageous to add texture improving agents to the pigment.

Suitable texture improving agents are, for example, fatty acids of not less than 12 carbon atoms, such as stearic or behenic acid or the amides, salts or esters thereof, such as magnesium, zinc or aluminium stearate or magnesium behenate, as well as quaternary ammonium compounds such as tri-($C_1$–$C_4$)-alkylbenzylammonium salts, as well as plasticisers such as expoxidised soya bean oil, waxes such as polyethylene wax, resin acids such as abietic acid, colophonium soap, hydrated or dimerised colophonium, $C_{12}$–$C_{18}$-paraffin disulfonic acids, alkyl phenols or alcohols such as stearyl alcohol and also lauryl or stearyl amine as well as aliphatic 1,2-diols such as dodecane-1,2-diol.

Preferred texture improving agents are lauryl or stearyl amine, aliphatic 1,2-diols, stearic acid, their amides, salts or esters, epoxidized soya bean oil, waxes or resinic acids.

Such additives may be added in amounts of from 0.05 to 20, preferably 1 to 10% by weight based on the solid pigment solution before, during or after their formation.

Solid solutions may be characterized by their X-ray diffraction pattern which differs from that of the physical mixture of the two individual components. The X-ray diffraction pattern of the solid solutions of the invention is characterized by different lines than the sum of the X-ray diffraction patterns of the individual components.

The solid solutions of the invention often display surprisingly large changes in shades as compared to the corresponding physical mixtures. One obtains thereby new colour effects with excellent fastness properties: a special advantage of the solid solutions of the invention.

The solid solutions of the invention are excellently suited as pigments for the colouration of high molecular organic material. They display different colouristic properties as compared to the starting pigments and may be present in transparent or opaque form, depending on the process of preparation. By means of thermal after-treatment in organic solvents they may, for example, be recrystallized very well, i.e. there is obtained an opaque form with a standardized pigment particle size and shape. Organic solvents which are preferably used, for example, benzenes substituted by halogen atoms, alkyl or nitro groups such as xylols, chlorobenzene, o-dichlorobenzene or nitrobenzene as well as pyridine bases such as pyridine, picoline or quinoline, and also ketones such as cyclohexanone, alcohols such as isopropanol, butanols or pentanols, ethers such as ethyleneglycolmonomethyl or monoethylether, amides such as dimethylformamide or N-methylpyrrolidone as well as dimethylsulfoxide or sulfolane.

Examples of high molecular organic materials which may be coloured or pigmented with the solid solutions of the invention are for example cellulose ethers and esters such as ethyl cellulose, nitrocellulose, cellulose acetate, cellulose butyrate, natural resins or synthetic resins such as polymerisation resins or condensation resins, for example aminoplasts, in particular urea/formaldehyde and melamine/formaldehyde resins, alkyd resins, phenolic plastics, polycarbonates, polyolefins, polystyrene, polyvinyl chloride, polyamides, polyurethanes, polyesters, ABS, polyphenylene oxides, rubber, casein, silicone and silicone resins, singly or in mixtures.

The solid solutions of the invention are particularly suited for the colouring of polyvinylchloride and polyolefines, such as polyethylene and polypropylene as well as for the pigmenting of varnishes and paints.

The above high molecular organic compounds may be used singly or as mixtures in the form of plastic masses, melts or in the form of spinning solutions, varnishes, paints or printing inks. Depending on the end use, it is advantageous to use the solid solutions of the invention as toners or in the form of preparations.

The solid solutions of the invention may be used in an amount of 0.01 to 30% by weight, preferably 0.1 to 10% by weight, based on the high molecular organic material to be pigmented.

The pigmenting of the high molecular organic substances with the solid solutions of the invention is carried out for example by incorporating such a solid solution, optionally in the form of masterbatches into these substrates using roll mills, mixing or grinding machines.

The pigmented material is then brought into the desired final form by methods which are known per se, for example calendering, moulding, extruding, coating, casting or by injection moulding. It is often desirable to incorporate so-called plasticisers into the high molecular compounds before processing in order to produce non-brittle mouldings or to diminish their brittleness. Suitable plasticisers are for example esters of phosphoric acid, phthalic acid or sebacic acid. The plasticisers may be incorporated before or after incorporating the composition into the polymers. To obtain different shades, it is also possible to add fillers or other chromophoric components such as white, coloured or black pigments, in any amount, to the high molecular organic compounds, in addition to the solid solutions of the invention.

For pigmenting varnishes, paints and printing inks, the high molecular organic materials and the solid solutions of the invention, together with optional additives such as fillers, other pigments, siccatives or plasticisers, are finely dispersed or dissolved in a common organic solvent or mixture of solvents. The procedure may be such that the individual components by themselves, or also several jointly, are dispersed or dissolved and that all the components are only subsequently mixed.

In the colouration of, for example polyvinylchloride or polyolefines, the solid solutions of the invention are characterized by good general pigmentation properties such as good dispersibility, high colour strength and purity, good fastness to migration, heat, light and weathering.

The invention is illustrated by the following Examples.

EXAMPLE 1

(a) 7.5 g of 3,6-di-(4-methylphenyl)-1,4-diketopyrrolo-[3,4-c]-pyrrol, 42.5 g of 3,6-di-(4-chlorophenyl)-1,4-diketopyrrolo-[3,4-c]-pyrrol and 700 ml of glacial acetic acid are stirred in a glass apparatus for 18 hours under reflux. The suspension so obtained is filtered at room temperature, the filter cake is washed with glacial acetic acid, dried in a vacuum drying cabinet at 80° C. and pulverised. 49 g of a red solid solution are obtained, the X-ray diffraction pattern of which differs from the X-ray diffraction pattern of the corresponding physical mixture of the above-mentioned starting products. When the solid solution is incorporated into plastics and varnishes there are obtained red colourations with excellent fastness to light, heat, migration and weathering, the shade of which differs distinctly from colouration with the corresponding physical mixture of the starting pigments.

(b) The procedure described in Example 1a is repeated in analagous manner, replacing the 700 ml of glacial acetic acid by 550 ml of hexane-1,2-diol and stirring for 10 hours at 190° C. The pigment suspension so obtained is diluted before isolation with 200 ml of methanol and the filter cake is washed with methanol. 48.8 g of a red solid solution are obtained having an analogous X-ray diffraction pattern but a somewhat higher degree of crystallinity than the solid solution obtained in Example 1a.

The diffraction picture is recorded on film in order to determine the interplanar spacing (d-values). Transmission recording is used with a Guinier camera (Enraf-Nonius FR 552$^R$) and Cu-K-alpha-1-radiation (wavelength=1.54050 Å). Quartz is used as the calibration substance, the d-values of which are calculated from a=4.913 Å and c=5.405 Å (PDF 5-490). The following table sets out the d-values of the heaviest lines (<2.7 Å) together with the relative line intensities estimated visually

| d-value in Å | Intensity |
| --- | --- |
| 11.7 | medium |
| 5.79 | very weak |
| 3.61 | strong |
| 3.46 | medium |
| 3.29 | weak |
| 3.15 | very strong |
| 2.87 | strong |
| 2.78 | strong |

The colour of the red solid solution of the invention is surprisingly of more blueish than that of the main component 3,6-di-(4-chlorophenyl)-1,4-diketopyrrolo-[3,4-c]-pyrrol when it is considered that the secondary component 3,6-di-(4-methylphenyl)-1,4-di-ketopyrrolo-[3,4-c]-pyrrol is yellowish red.

EXAMPLE 2

A glass vessel of 750 ml capacity is charged with 450 ml of tert.-amyl alcohol and nitrogen is passed through slowly, 6.9 g of sodium and then 0.9 g of sodium bis(2-ethylhexyl)sulfosuccinate are added as emulsifier to the tert.-amyl alcohol and the mixture is slowly heated to 95°–100° C. The metal is dissolved in the alcohol with vigorous stirring. The solution so obtained is cooled to 60° C. There are then added 34.5 g of 3,6-di-(4-methylphenyl)-1,4-diketopyrrolo-[3,4-c]-pyrrol as well as 6.0 g of 3,6-di-(3-methylphenyl)-1,4-diketopyrrolo-[3,4-c]-pyrrol. The reaction mixture is then stirred for 2½ hours under reflux and afterwards cooled to 60° C.

A glass vessel of 2500 ml capacity is charged with 400 ml of water and the above pigment-salt mixture is poured onto the water under stirring over 10 minutes. The resultant two-phase mixture is stirred for 4 hours under reflux (85° C.) after which the tert.-amyl alcohol is steam-distilled off and the pigment suspension separated by filtration. The filter cake is washed neutral with water, dried in a vacuum drying cabinet at 80° C. and pulverised. 38.5 g of a scarlet solid solution is obtained, the X-ray diffraction pattern of which differs from the X-ray diffraction pattern of the corresponding physical mixture of the above mentioned starting products.

The interplanar spacings are determined as described in Example 1b).

The following table gives the d-values of the heaviest lines (>2.3 Å) together with the relative line intensities estimated visually.

| d-value in Å | Intensity |
| --- | --- |
| 11.5 | very strong |
| 5.67 | strong |
| 3.64 | weak |
| 3.61 | medium |
| 3.32 | very strong |
| 3.29 | medium |
| 2.84 | medium |
| 2.73 | very weak |
| 2.33 | weak |

The colour of the red solid solution of the invention is surprisingly yellower than that of the main component 3,6-di-(4-methylphenyl)-1,4-diketopyrrolo-[3,4-c]-pyrrol when it is recalled that the other component 3,6-di-(3-methylphenyl)-1,4-diketopyrrolo-[3,4-c]-pyrrol is blueish-red.

EXAMPLE 3

A ball mill having a capacity of ca. 1 liter containing 1.5 kg of steel balls (diameter: 1.2 cm) and 150 g of nails (3 cm long) as grinding bodies is charged with 4,3 g of 3,6-di-(3-cyanophenyl)-1,4-diketopyrrolo-[3,4-c]-pyrrol, 0.8 g of 3,6-di-(4-methylphenyl)-1,4-diketopyrrolo-[3,4-c]-pyrrol, 0.8 ml of tetrachloroethylene, 0.3 g of epoxidized soya bean oil and 20 g of aluminium sulfate [$Al_2(SO_4)_3.15-18H_2O$]. The mill is tightly closed and rolled for 6 hours on a roller bed for 6 hours at room temperature. The grinding stock is then separated from the grinding bodies and stirred into a solution of 1.5 ml of concentrated sulfuric acid in 300 ml of sulfuric acid in 300 ml of water. The suspension is heated to 70° C. and stirred at this temperature for 1½ hours. The product is separated by filtration and the filter cake is washed until neutral and free of salt with hot water, dried in a vacuum drying cabinet at 70° C. and pulverised. The powder so obtained is stirred into 70 ml of n-butanol for 16 hours under reflux, then separated by filtration at 40° C., the filter cake is washed with a little n-butanol, dried in a vacuum drying cabinet at 70° C. and pulverised. There are obtained 4.7 g of an orange-coloured solid solution, the X-ray diffraction pattern of which differs from the X-ray diffraction pattern of the corresponding physical mixture of the above mentioned starting products. When incorporated into plastics and varnishes there are obtained strong orange colourations having very good fastness to light, weathering, heat and migration.

EXAMPLE 4

The procedure of Example 3 is repeated using, in place of 3,6-di-(4-methylphenyl)-1,4-diketopyrrolo-[3,4-c]-pyrrol 3,6-di-(4-chlorophenyl)-1,4-diketopyrrolo-[3,4-c]-pyrrol. There is obtained an orange solid solution, the X-ray diffraction pattern of which differs from the X-ray diffraction pattern of the corresponding physical mixture of the above mentioned starting products. Incorporation into plastics and varnishes gives orange colourations with excellent fastness to heat, light and weathering.

EXAMPLE 5

A glass vessel of 350 ml capacity is charged with 150 ml of tert.-amyl alcohol and nitrogen is slowly passed through. 2.3 g of sodium and then 0.3 g of sodium bis-(2-ethylhexyl)sulfosuccinate as emulsifier are added to the tert.-amyl alcohol and the mixture is slowly heated to 95°–100° C. The metal is dissolved in the alcohol with vigorous stirring. The solution so obtained is cooled to 60° C. 11.5 g of 3,6-di-(4-bromophenyl)-1,4-diketopyrrolo-[3,4-c]-pyrrol and 2.0 g of 3,6-di-(4-methylphenyl)-1,4-diketopyrrolo-[3,4-c]-pyrrol are added. The reaction mixture is stirred for 2 hours under reflux and then cooled to 60° C.

A glass vessel of 1500 ml capacity is charged with 300 ml water and the above pigment/salt mixture is added over 10 minutes with stirring into the precharged water. The two-phase mixture so obtained is stirred for 4 hours under reflux (85° C.). The tert.-amyl alcohol is then distilled off and the aqueous pigment suspension filtered. The filtercake is washed neutral with water and then dried in a vacuum drying cabinet at 80° C. and pulverised. There are obtained 12.5 g of a red solid solution, the X-ray diffraction pattern of which differs from the X-ray diffraction pattern of the corresponding physical mixture of the above mentioned starting products. Incorporation of the solid solution into plastics and varnishes gives very strong red colourations of high saturation having excellent fastness to light, weathering, heat and migration. An electron photomicrograph of the solid solution so obtained shows pigment crystals of uniform, even crystal appearance.

EXAMPLE 6

Into a glass vessel of 250 ml capacity there are stirred 8.5 g of 3,6-di-(4-methylphenyl)-1,4-diketopyrrolo-[3,4-c]-pyrrol, 1.5 g of 3,6-diphenyl-1,4-diketopyrrolo-[3,4-c]-pyrrol in 60 ml of concentrated sulfuric acid for 2 hours at 15°–20° C. The mixture is poured with stirring into 400 ml of ice-water. The suspension is heated to 70° C. and stirred for 1 hour at 70° C., filtered hot, the filter cake washed with water until neutral and elutriated in 100 ml of n-butanol. The suspension is stirred for 18 hours under reflux, cooled to room temperature and filtered. The filter cake is washed with n-butanol, dried in a vacuum drying cabinet at 80° C. and pulverised. There are obtained 9.3 g of a red solid solution, the X-ray diffraction pattern of which differs from the X-ray diffraction pattern of the corresponding physical mixture of the above mentioned starting products. Incorporation of the solid solution into plastics and varnishes gives very strong red colourations with good covering power and having excellent fastness to light, heat, weathering and migration. An electron photomicrograph of the solid solution so obtained shows pigment crystals of uniform even crystal appearance.

EXAMPLE 7

59.5 g of 3,6-diphenyl-1,4-diketopyrrolo-[3,4-c]-pyrrol, 10.5 g of 3,6-di-(3-chlorophenyl)-1,4-diketopyrrolo-[3,4-c]-pyrrol, 4.5 g of 8-hydroxymethyl-tricyclo[$5.2.1.0^{2,6}$]decane [$^R$TCD-alcohol M, HOECHST] and 800 ml of water are throroughly stirred in a beaker for 1 hour at room temperature. The suspension so obtained is thoroughly ground for 3 hours and 30 minutes at 20°–25° C. at a stirring speed of 3000 rpm and a pumping rate of 400 ml/min at 20°–25° C. for 3 hours and 30 minutes in a KDL DYNO mill (available from Willy A. Bachofen, Basel) provided with a 600 ml steel mixing chamber filled with 480–510 ml of glass beads of ca. 1 mm diameter. The mill is washed out with 1 liter of water and the combined suspension is separated by filtration. The filter cake is washed with water, dried in a vacuum drying cabinet at 80° C. and pulverised. There is obtained a red solid pigment solution, the X-ray diffraction pattern of which differs from the X-ray diffraction pattern of the corresponding physical mixture of the above mentioned starting products. On incorporation of the solid solution into plastics and varnishes very transparent, strong red colorations with excellent fastness properties are obtained.

5 g of the above described red fine crystalline solid solution are stirred in 70 ml of n-butanol for 16 hours under reflux. The suspension is isolated by filtration at 40° C., the filter cake is washed with a little n-butanol, dried in a vacuum drying cabinet at 80° C. and pulverised. In so doing there is obtained the above described solid solution in recrystallized coarse crystalline form which gives opaque colourations with excellent fastness properties on incorporation into plastics and varnishes.

EXAMPLE 8

The procedure of Example 7 is repeated, using in place of 59.5 g only 43.2 g of 3,6-diphenyl-1,4-diketopyrrolo-[3,4-c]-pyrrol and in place of 10.5 g of 3,6-di-(3-chlorophenyl)-1,4-diketopyrrolo-[3,4-c]-pyrrol, 30 g of 3,6-di-(4-tert.-butylphenyl)-1,4-diketopyrrolo-[3,4-c]-pyrrol a blueish red solid solution being obtained, the X-ray diffraction pattern of which differs from the X-ray diffraction pattern of the corresponding physical mixture of the above described starting products. On incorporating the solid solution into plastics such as polyethylene, there are obtained blueish red colourations of high saturation and strength with excellent fastness to light, weathering and heat.

EXAMPLE 9

The procedure of Example 7 is repeated, using in place of 59.5 g of 3,6-diphenyl-1,4-diketopyrrolo-[3,4-c]-pyrrol, 63.2 g of 3,6-di-(4-methylphenyl)-1,4-diketopyrrolo-[3,4-c]-pyrrol and in place of 10.5 g of 3,6-di-(3-chlorophenyl)-1,4-diketopyrrolo-[3,4-c]-pyrrol 35.7 g of 3,6-di-(4-chlorophenyl)-1,4-diketopyrrolo-[3,4-c]pyrrol a red solid solution being obtained, the X-ray diffraction pattern of which differs from the X-ray diffraction pattern of the corresponding physical mixture of the above mentioned starting products. Incorporation of the solid solution into plastics and varnishes gives very strong red colourations.

Recrystallization of the fine crystalline solid solution obtained in Example 7 from n-butanol gives the solid solution in coarse crystalline form which, on incorporation into plastics and varnishes, yields opaque red colorations with excellent fastness properties. Opaque finishing varnishes containing the solid solution so obtained do not, unlike those containing pure 3,6-di-(4-methylphenyl)-1,4-diketopyrrolo-[3,4-c]-pyrrol, post-darken on weathering.

EXAMPLE 10

To a ball mill having a capacity of ca. 1 liter containing 1.5 kg of steel balls (diameter: 1.2 cm) and 150 g of nails (length: 3 cm) as grinding bodies are added 4.4 g of 3-(3-chlorophenyl)-6-phenyl-1,4-diketopyrrolo-[3,4-c]-pyrrol, 0.8 g of 3,6-diphenyl-1,4-diketopyrrolo-[3,4-c]-pyrrol, 0.8 ml of tetrachloroethylene, 0.3 g of sodium dodecylbenzene sulfonate and 20 g of aluminium sulfate [$Al_2(SO_4)_3.15-18H_2O$]. The tightly closed mill is rolled on a roller bed at room temperature for 6 hours. The grinding medium is then separated from the grinding bodies and stirred into a solution of 1.5 ml of concentrated sulfuric acid in 300 ml of water. The suspension is heated to 70° C. and stirred at this temperature for 1½ hours. The product is isolated by filtration, the filter cake is washed until neutral and salt free in hot water, dried in a vacuum drying cabinet at 70° C. and pulverised. There are obtained 4.8 g of a red solid solution, the X-ray diffraction pattern of which differs from the X-ray diffraction pattern of the corresponding physical mixture of the above mentioned starting products. Incorporation into plastics and varnishes gives very strong red colourations with very good fastness to light, heat and migration.

Recrystallization of the fine crystalline solid solution obtained in Example 7 from n-butanol yields the solid solution in coarse crystalline form which, on incorporation into plastics and varnishes, gives opaque red colourations with excellent fastness properties.

EXAMPLE 11

The procedure of Example 10 is repeated, using in place of 3,6-diphenyl-1,4-diketopyrrolo-[3,4-c]-pyrrol the same amount[1] of 3,6-di-(3-cyanophenyl)-1,4-diketopyrrolo-[3,4-c]-pyrrol, an orange coloured solid solution being obtained, the X-ray diffraction pattern of which differs from the X-ray diffraction pattern of the physical mixture of the corresponding starting products, having excellent pigment properties.

[1] always amounts by weight are meant

EXAMPLE 12

The procedure of Example 10 is repeated, using in place of 3,6-diphenyl-1,4-diketopyrrolo-[3,4-c]-pyrrol the same amount of 3,6-di-(3-methylphenyl)-1,4-diketopyrrolo-[3,4-c]-pyrrol, a red solid solution being obtained, the X-ray diffraction pattern of which differs from the X-ray diffraction pattern of the physical mixture of the corresponding starting pigments, having excellent pigment properties on incorporation into plastics and varnishes.

EXAMPLE 13

The procedure of Example 10 is repeated, using in place of 4.4 g 0.8 g of 3-(3-chlorophenyl)-6-phenyl-1,4-diketopyrrolo-[3,4-c]-pyrrol and in place of 0.8 g of 3,6-diphenyl-1,4-diketopyrrolo-[3,4-c]-pyrrol 4.4 g of 3-(3-chlorophenyl)-6-phenyl-1.4-diketopyrrolo-[3,4-c]-pyrrol, a red solid solution being obtained, the X-ray diffraction pattern of which differs from the X-ray diffraction pattern of the physical mixture of the corresponding starting pigments. Incorporation of the solid solution so obtained into plastics and varnishes gives red colourations with excellent fastness to heat, light, weathering and migration.

EXAMPLE 14

The procedure of Example 10 is repeated, using in place of 3,6-diphenyl-1,4-diketopyrrolo-[3,4-c]-pyrrol the same amount of 3-(4-chlorophenyl)-1,4-diketopyrrolo-[3,4-c]-pyrrol, a red solid solution being obtained, the X-ray diffraction pattern of which differs from the X-ray diffraction pattern of the physical mixture of the corresponding starting products. Incorporation of the solid solution so obtained into plastics and varnishes gives red colourations with excellent fastness to heat, light, weathering and migration.

EXAMPLE 15

The procedure of Example 14 is repeated, using in place of 0.8 g 2.1 g of 3-(4-chlorophenyl)-6-phenyl-1,4-diketopyrrol-[3,4-c]-pyrrol and in place of 4.4 g 3-(3-chlorophenyl)-6-phenyl-1,4-diketopyrrolo-[3,4-c]-pyrrol 3.1 g of 3-(4-chlorophenyl)-1,4-diketopyrrolo-[3,4-c]-pyrrol, a red solid solution being obtained, the X-ray diffraction pattern of which differs from that of the physical mixture of the corresponding starting products. Incorporation of the solid solution so obtained into plastics and varnishes gives red colourations with excellent fastness to heat, light, weathering and migration.

EXAMPLE 16

The procedure of Example 13 is repeated, using in place of 3-(3-chlorophenyl)-6-phenyl-1,4-diketopyrrolo-[3,4-c]-pyrrol the same amount of 3,6-di-(3-chlorophenyl)-1,4-diketopyrrolo-[3,4-pyrrol, a red solid solution being obtained, the X-ray diffraction pattern of which differs from the X-ray diffraction pattern of the physical mixture of the corresponding starting products and which, when incorporated into plastics and varnishes, gives red colourations with excellent fastness properties.

EXAMPLE 17

The procedure of Example 14 is repeated, using in place of 3-(3-chlorophenyl)-6-phenyl-1,4-diketo-pyrrolo-[3,4-c]-pyrrol the same amount of 3,6-di-(4-methylphenyl)-1,4-diketopyrrolo-[3,4-c]-pyrrol, a red solid solution being obtained, the X-ray diffraction pattern of which differs from the X-ray diffraction pattern of the physical mixture of the corresponding starting products and the incorporation of which into plastics and varnishes gives red colourations with excellent fastness properties, high saturation and, when recrystallised from organic solvents such as n-butanol, great opacity.

EXAMPLE 18

The procedure of Example 12 is repeated, using in place of 3-(3-chlorophenyl)-6-phenyl-1,4-diketopyrrolo-[3,4-c]-pyrrol the same amount of 3-(4-chlorophenyl)-6-phenyl-1,4-diketopyrrolo-[3,4-c]-pyrrol, a red solid solution being obtained, the X-ray diffraction pattern of which differs from that of the physical mixture of the corresponding starting compounds and the incorporation of which into plastics and varnishes gives red colourations with high fastness properties.

EXAMPLE 19

40 mg of the solid solution obtained in Example 1b are thoroughly mixed with 7.3 ml of dioctylphthalate and 13.3 g of $^R$LONZA stabilised polyvinylchloride E 722 in a beaker using a glass rod. The mixture is processed to a thin sheet on a roll mill for 5 minutes at 160° C. The PVC sheet so obtained is coloured in a very strong blueish red shade with very good fastness to migration and light.

EXAMPLE 20

A mixture of
130 parts of steatite balls (diameter=8 mm)
47.5 parts of a thermosetting acrylic varnish consisting of
41.3 parts of acrylic resin $^R$VIACRYL VC 373, 60% (VIANOVA Kunstharz AG),
16.3 parts of melamine resin $^R$MAPRENAL TTX, 55% (HOECHST AG),
32.8 parts of xylene,
4.6 parts of ethylglycol acetate,
2.0 parts of butyl acetate and
1.0 part of $^R$Silicone oil A, 1% in xylene (BAYER AG)
&
2.5 parts of the solid solution obtained in Example 7
is dispersed in a 200 ml glass flask with twist-off cap for 72 hours on a roller gear bed. After separating the steatite balls
8.0 parts of the dispersed full shade mixture,
0.6 parts of aluminium paste $^R$ALCOA (60–65% Al-content, Aluminium Corp. of America)
1.0 part methylethyl ketone and
18.4 parts of the above thermosetting acrylic varnish are mixed well, sprayed onto aluminium sheets and subsequently stoved for 30 minutes at 130° C.

Very strong red metal effect varnishes with excellent fastness properties are obtained.

Substitution of the solid solution obtained in Example 7 by another solution according to one of the other examples gives equally high quality colourations.

EXAMPLE 21

A mixture of 130 g of steatite balls having a diameter of 8 mm, 47.5 g of alkyd/melamine stoving varnish, consisting of 60 g of non-viscous alkyd resin $^R$BECKOSOL 27-320 (Reichhold Chemie AG) 60% in xylene, 36 g of melamine resin $^R$SUPER-BECKAMIN 13-501 (Reichhold Chemie AG) 50% in a 2:1 mixture of xylene/butanol, 2 g of xylene and 2 of ethylene glycol monomethyl ether and 2.5 g of the solid solution obtained in Example 5 are dispersed in a 200 ml glass flask with twist-off closure for 120 hours on a roller gear table. After separating the steatite balls 2.4 g of the so dispersed full shade mixture are mixed with 60 g of titanium dioxide $^R$KRONOS RN 59 (KRONOS Titan GmbH) and a further 24.0 g of the alkyd/melamine stoving varnish and subsequently stoved for 30 minutes at 130° C. to give very strong red colourations of excellent fastness properties.

EXAMPLE 22

A mixture consisting of 1.0 g of the solid solution obtained in Example 9, 1.0 g of antioxidant ($^R$IRGANOX 1010, CIBA-GEIGY AG) and 1000 g of high density polyethylene granulate ($^R$VESTOLEN A 60-16, HUELS) are premixed for 15 minutes in a glass bottle on a roller gear table. The mixture is then extruded in two passes in a single screw extruder. The granulate so obtained is moulded to plates at 220° C. in an injection moulding machine (Allround Aarburg 200) and then post-formed for 5 minutes at 180° C. The mouldings are coloured in strong red shades having excellent fastness properties.

EXAMPLE 23

1000 g polypropylene granules ($^R$DAPLEN PT-55, Chemie LINZ) and 20 g of a 50% pigment preparation consisting of 10 g of the solid solution obtained in Example 14 and 10 g of magnesium behenate are thoroughly mixed in a mixing drum. The granules so treated are melt spun at 260°–285° C. to red filaments of very good light fastness and textile fibre properties.

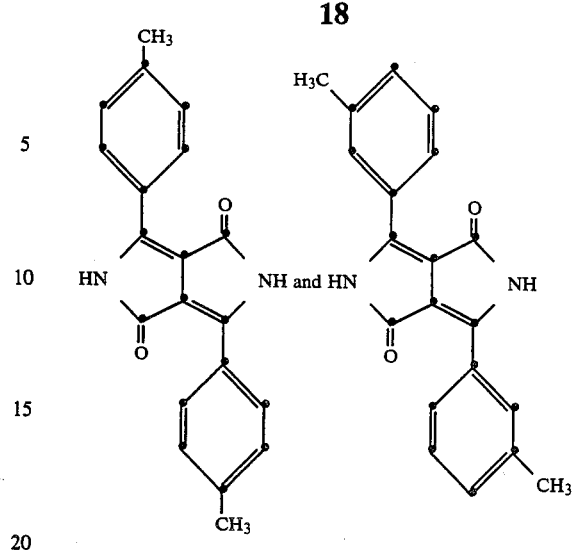

What is claimed is:

1. A solid solution of 1,4-diketo-pyrrolo-[3,4-c]-pyrrols consisting of two different compounds having the formulae

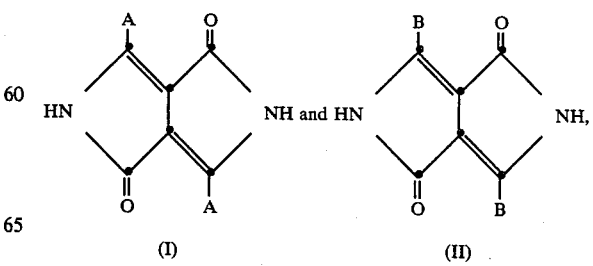

the formulae

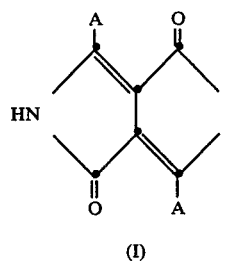 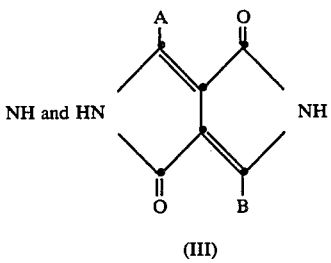

(I)    (III)

or the formulae

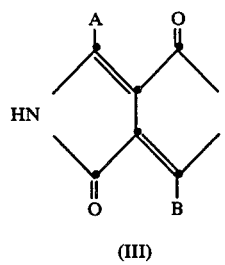 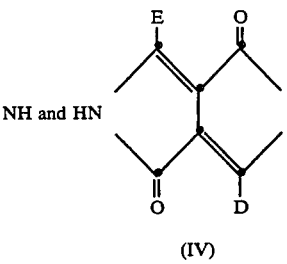

(III)    (IV)

in which A is a group selected from

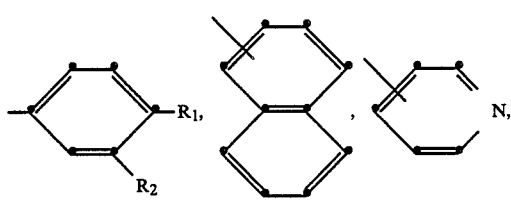

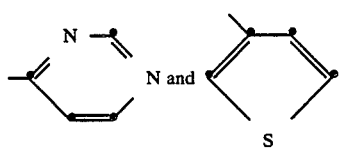

and B, E and D are each independently a group

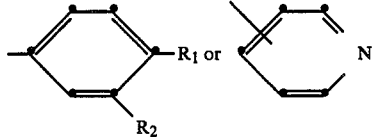

where $R_1$ and $R_2$ are each independently hydrogen, halogen, $C_1$–$C_5$-alkyl, $C_1$–$C_5$-alkoxy, —$SR_3$, —$N(R_3)_2$, —$CF_3$, —CN or a group of the formulae

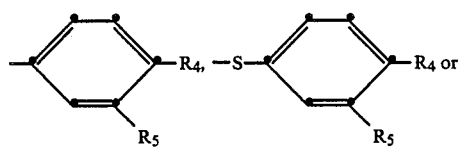

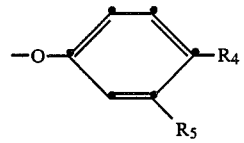

$R_3$ is $C_1$–$C_5$-alkyl and $R_4$ and $R_5$ are independently hydrogen, halogen, $C_1$–$C_5$-alkyl, $C_1$–$C_5$-alkoxy, —$SR_3$ or CN, in which the X-ray diffraction patterns of the solid solutions differ from the sum of the X-ray diffraction patterns of the individual components.

2. A solid solution according to claim 1 which consists of the two components of Formulae I:II, I:III or III:IV in a ratio of 50–95:5–50% by weight.

3. A solid solution according to claim 1 which consists of two different compounds of Formulae I and II where A and B have the meaning given in claim 1.

4. A solid solution according to claim 1 which consists of two different compounds of Formulae I and II where A and B are each independently a group of formula

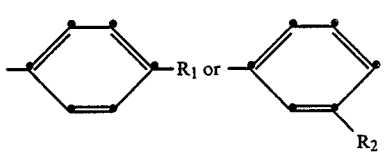

where $R_1$ is hydrogen, chlorine, bromine, cyano, methyl, ethyl, tert.-butyl or phenyl and $R_2$ is hydrogen, chlorine, methyl or cyano.

5. A solid solution according to claim 1 which consists of compounds of the formulae

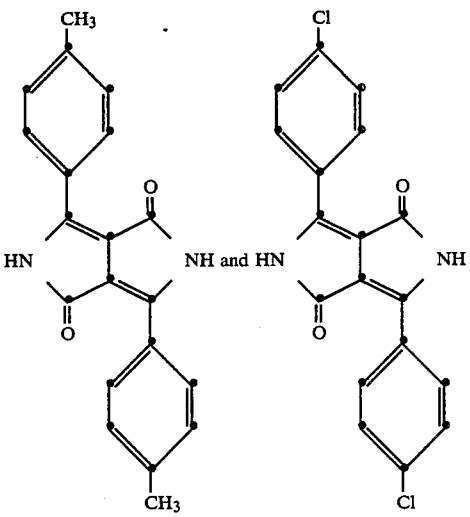

6. A solid solution according to claim 1 which consists of compounds of the formulae